US010842146B1

(12) United States Patent
Pannullo

(10) Patent No.: US 10,842,146 B1
(45) Date of Patent: Nov. 24, 2020

(54) INSECT REPELLENT TORCH SYSTEM WITH AUTOMATIC FUEL REPLENISHMENT

(71) Applicant: Joseph Pannullo, Essex Fells, NJ (US)

(72) Inventor: Joseph Pannullo, Essex Fells, NJ (US)

(*) Notice: Subject to any disclaimer, the term of this patent is extended or adjusted under 35 U.S.C. 154(b) by 0 days.

(21) Appl. No.: 16/928,767

(22) Filed: Jul. 14, 2020

(51) Int. Cl.
*A01M 29/12* (2011.01)
*F21V 37/00* (2006.01)
*F21S 15/00* (2006.01)
*F21W 131/10* (2006.01)

(52) U.S. Cl.
CPC ............. *A01M 29/12* (2013.01); *F21S 15/00* (2013.01); *F21V 37/002* (2013.01); *F21V 37/0012* (2013.01); *F21V 37/0045* (2013.01); *F21W 2131/10* (2013.01)

(58) Field of Classification Search
CPC . A01M 29/12; A01M 1/2044; F21V 37/0012; F21V 37/0045; F21V 37/002; F21S 15/00; F21W 2131/10; F23D 3/02; F23D 3/28; F23D 3/30; F23D 3/32
See application file for complete search history.

(56) References Cited

U.S. PATENT DOCUMENTS

| 418,113 A | * | 12/1889 | Marzo | F23D 3/02 431/319 |
| 826,423 A | * | 7/1906 | Haden | A24F 15/10 431/319 |
| 1,142,816 A | * | 6/1915 | Kaufman | A24F 15/10 431/319 |
| 1,391,956 A | * | 9/1921 | Holland | F23D 11/44 137/390 |
| 1,763,164 A | * | 6/1930 | Lavigne | F23D 3/00 431/115 |
| 1,905,918 A | * | 4/1933 | Lennmor | F23D 3/28 236/1 R |

(Continued)

FOREIGN PATENT DOCUMENTS

| EP | 0096111 B2 | 12/1983 | |
| JP | 63201422 A | * 8/1988 | ............. F23N 1/002 |
| JP | 2003343837 A | 5/2002 | |

OTHER PUBLICATIONS

JP-63201422-A_English translation (Year: 1988).*
"SWAT Mosquito Systems," Web Page <https://swatmosquitosystems.com/>, Date Accessed Jul. 6, 2020.

*Primary Examiner* — Jorge A Pereiro
(74) *Attorney, Agent, or Firm* — Maine Cernota & Rardin

(57) ABSTRACT

A system for repelling insects from an outdoor area includes at least one torch configured to disburse an insect repellant by burning a fuel, and a central fuel reservoir interconnected with the torches by a fuel plumbing system and configured to automatically replenish the fuel in a local reservoir of the torch. Fuel can be gravitationally transferred from the central reservoir to the torches, or maintained under pressure in the plumbing system and controlled by level sensors and valves in the torches. A remotely operated wick seal can exclude air from torch interiors and prevent fuel spills. A central controller and/or local torch controllers can be powered by wires and/or by batteries, which can be recharged by solar power. The controllers can be wirelessly monitored and/or controlled by software running on a remote device. The remote device and software can control a plurality of the systems.

22 Claims, 16 Drawing Sheets

(56) References Cited

U.S. PATENT DOCUMENTS

| | | | | |
|---|---|---|---|---|
| 2,276,039 A * | 3/1942 | Horther | | 431/128 |
| 2,495,230 A | 1/1950 | Day et al. | | |
| 3,817,686 A | 6/1974 | Quittner | | |
| 4,417,870 A * | 11/1983 | Nakamura | | F24C 5/06 |
| | | | | 192/28 |
| 4,470,433 A * | 9/1984 | Vipond | | E21B 17/1035 |
| | | | | 138/106 |
| 4,582,478 A | 4/1986 | Hilker | | |
| 4,835,663 A * | 5/1989 | Abbott | | F21S 13/00 |
| | | | | 362/159 |
| 4,847,192 A * | 7/1989 | Fujimoto | | F23D 3/28 |
| | | | | 431/307 |
| 5,263,794 A * | 11/1993 | Webb | | B67D 7/78 |
| | | | | 405/129.55 |
| 5,297,896 A * | 3/1994 | Webb | | B67D 7/78 |
| | | | | 138/114 |
| 5,472,340 A * | 12/1995 | Lynch | | F23G 7/085 |
| | | | | 431/183 |
| 5,540,250 A * | 7/1996 | Mullins | | F16L 55/1015 |
| | | | | 137/75 |
| 5,932,842 A * | 8/1999 | Eberl | | F16L 11/127 |
| | | | | 174/47 |
| 6,006,773 A * | 12/1999 | Bravo | | B67D 7/78 |
| | | | | 137/15.08 |
| 6,370,738 B1 * | 4/2002 | Dion, Jr. | | B67D 7/04 |
| | | | | 222/320 |
| 6,746,235 B1 * | 6/2004 | Aszenbrenner | | F23D 3/02 |
| | | | | 431/320 |
| 8,191,932 B2 * | 6/2012 | Davis | | F16L 37/40 |
| | | | | 285/316 |
| 8,390,981 B1 * | 3/2013 | Treadaway | | F23Q 21/00 |
| | | | | 361/253 |
| 8,435,029 B2 | 5/2013 | Masterson et al. | | |
| 9,267,681 B2 | 2/2016 | Barudi et al. | | |
| 10,317,077 B2 | 6/2019 | Hansen et al. | | |
| 2002/0146656 A1 * | 10/2002 | Thigpen | | F21V 37/00 |
| | | | | 431/253 |
| 2005/0104371 A1 * | 5/2005 | Atkinson | | F16L 41/021 |
| | | | | 285/133.11 |
| 2006/0134571 A1 * | 6/2006 | St-Germain | | F23D 3/02 |
| | | | | 431/319 |
| 2007/0160944 A1 * | 7/2007 | Knight | | F23Q 3/006 |
| | | | | 431/264 |
| 2011/0198550 A1 * | 8/2011 | Howard | | F21S 13/10 |
| | | | | 256/59 |
| 2011/0198551 A1 * | 8/2011 | Howard | | F23D 3/18 |
| | | | | 256/59 |
| 2012/0258412 A1 * | 10/2012 | Jackow | | F23D 14/60 |
| | | | | 431/254 |
| 2012/0282559 A1 | 11/2012 | Barudi et al. | | |
| 2013/0114244 A1 * | 5/2013 | Formico | | A01M 1/2077 |
| | | | | 362/96 |
| 2014/0134546 A1 | 5/2014 | Masterson et al. | | |
| 2014/0362560 A1 * | 12/2014 | Formico | | A01M 1/04 |
| | | | | 362/96 |
| 2014/0371927 A1 * | 12/2014 | Pooladsanj | | G05D 7/0617 |
| | | | | 700/282 |
| 2015/0144713 A1 * | 5/2015 | Formico | | A01M 29/12 |
| | | | | 239/276 |
| 2017/0254532 A1 * | 9/2017 | Bauswell | | F21V 35/003 |
| 2017/0268775 A1 * | 9/2017 | Lev | | C11C 5/00 |
| 2018/0072965 A1 * | 3/2018 | Han | | F23Q 3/006 |
| 2020/0003412 A1 * | 1/2020 | Bianchini | | F23D 3/26 |

* cited by examiner

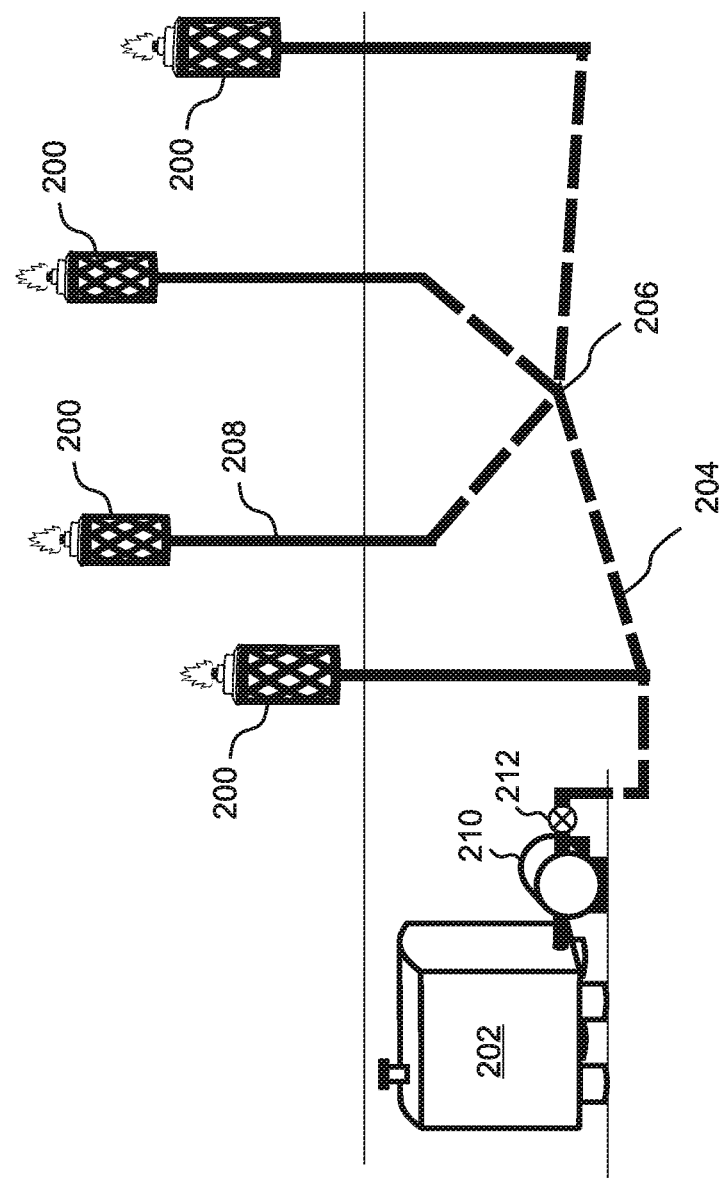

INSECT REPELLENT TORCH SYSTEM WITH AUTOMATIC FUEL REPLENISHMENT

FIELD OF THE INVENTION

The invention relates to apparatus for controlling and repelling insect pests, and more particularly, to torches that repel insects by burning a fuel that contains an insect repellant substance.

BACKGROUND OF THE INVENTION

The enjoyment of outdoor activities during periods of warm weather is highly popular, but is often hindered by the prevalence of insect pests, which can include swarming insects such as gnats as well as biting insects such as black flies and mosquitos. Furthermore, Mosquitos are the greatest menace for spreading diseases like dengue, malaria, yellow fever, zika, west nile, and many others, causing millions of deaths each year. More than 35% of the world population lives in an area where the risk of diseases like dengue is high.

According to the recent statistics of the US CDC (Centre for Disease Control and Prevention) published in the year 2019, the incidence of dengue, has risen by 30 times in the past 30 years, worldwide. The report also states that the parasite disease called limphatic filaraisis that is transmitted by repeated mosquitos bites over a period of a few months affects more than 120 million people in approximately 72 different countries.

One approach is to apply an insect repellent directly to the skin. However, this approach is sometimes undesirable, because of the residue that remains on the skin after the outdoor activity has concluded, as well as concerns regarding toxicity that might be absorbed by the skin, and a reluctance to spend time applying the repellant and subsequently washing the repellant off again. Furthermore, repellants applied to the skin may fail to provide adequate protection from insects, for example if there is an inadvertent failure to apply the repellant to certain skin regions. Furthermore, some insects, such as mosquitos, are frequently able to bite a victim through clothing, or on the scalp through hair or at a location where the hair is parted and the underlying scalp is exposed.

Many outdoor activities, such as barbecues, take place in relatively limited areas, such as on a deck or patio, or in a limited region that has been set aside specifically for such activities. One approach in such cases is to spray the area with an insecticide or repellant before the activity begins. Systems exist that provide permanently installed insecticide misting jets fed from a central tank of insecticide, intended for periodic, automated misting of an outdoor area with insecticide. However, insecticides are toxic and noxious, and are therefore limited to application when an outdoor area is not in use. Furthermore, insecticides can leave a toxic residue on tables, chairs, and other surfaces, and are mainly effective at the time of application, because they lose most of their ability to kill pests as they disburse and dry. To the extent that pesticides may have any long-term effectiveness, that benefit is lost if the pesticide residue is washed away by rain or by lawn irrigation. For that reason, some pesticide systems include an option for a user to invoke spray on-demand for increased effectiveness during high pest periods, and/or to re-apply the pesticide after rainfall or lawn irrigation. In addition, the application of pesticides in large quantities can be harmful to the environment.

Another approach is to surround an activity area with devices that attract and electrocute insects, in the hope that any approaching insects will be lured away and destroyed before they reach the outdoor activity area. However, this approach can backfire, in that the luring features of these devices can draw additional insects to the activity area, such that even though some insects are intercepted, a large number of others continue past the devices and enter the activity area.

With reference to FIG. 1, another, somewhat more effective method for repelling insects from an outdoor activity area 100 is to surround the area 100 with torches 102 that burn a fuel that is mixed with an insect repellent such as citronella. Often, the torches are supported on poles that are simply inserted into the ground. Ironically, this approach can be least effective where it is most needed, which is in wet climates, because the ground can become too soft and water-saturated to support the torches, especially when rain is accompanied or followed by wind. As an alternative, the torches can be permanently mounted, for example set into a cement slab, removably insertable into holes provided in an underlying hard surface, or supported by removable stands 104, which can be filled with sand or water to increase weight and stability.

As the fuel is burned in the torches 102, the repellant is continuously vaporized and disbursed throughout the activity area 100, thereby continuing to repel insects away from the area 100 for as long as the torches 102 continue to burn. Furthermore, if an activity takes place, or continues, after sunset, the light from the torches 102 can be an esthetically attractive feature. For these reasons, so-called "Tiki" torches 102 are very frequently used to repel mosquitos, fireflies, insects, and other pests. In particular, "tiki" torches 102 are highly preferred for repelling mosquitos.

However, such torches 102 typically have small fuel reservoirs, which can become exhausted before an outdoor activity has ended. While such torches 102 can typically be refilled, most cannot be safely refilled while in use, nor can they be safely refilled after use until they have cooled to a temperature that is near ambient.

What is needed, therefore, is an effective apparatus and method of repelling insect pests away from an outdoor activity area that does not require direct application of chemicals to the skin, does not require pre-emptive application of pesticides or other noxious or harmful chemicals to the outdoor activity area and/or environs, and can continue to repel insects with undiminished effectiveness for extended periods of time without user maintenance.

SUMMARY OF THE INVENTION

The present invention is an effective apparatus and method of repelling insect pests away from an outdoor activity area that does not require direct application of chemicals to the skin, does not require pre-emptive application of pesticides or other noxious or harmful chemicals to the outdoor activity area and/or environs, and can continue to repel insects with undiminished effectiveness for extended periods of time without user maintenance.

Specifically, the present invention is a system that includes at least one fuel-burning torch in combination with an automatic refueling system that refuels the torch or torches as needed by dispensing fuel from a central reservoir through a fuel plumbing system to each of the torches, so that they can continue burning almost indefinitely. By mixing an insect repellent substance, such as citronella, with the fuel that is supplied to the torches, the disclosed apparatus and method can be used to repel insect pests away from areas that are proximal to the torches for very long periods of time. Protection can be extended even further by re-filling the central reservoir with fuel, where said refueling can be performed while the torches are in operation. While the torches are interconnected with each other and with the central reservoir by the fuel plumbing system, the torches in the disclosed system are otherwise structurally independent and separate from each other and from the central reservoir, although embodiments further include wires that convey signals and/or electrical power between the torches and a central controller that is proximal to the central reservoir.

More specifically, the disclosed apparatus includes at least one torch, where each of the torches includes a wick that extends from a local fuel reservoir (the "local reservoir") to a combustion area. When in use, as the fuel is burned and consumed in the combustion area, the wick draws additional fuel as needed from the local fuel reservoir. A fuel plumbing system provides liquid communication between a central fuel reservoir (the "central reservoir") and the local reservoir. In embodiments that include a plurality of torches, the fuel plumbing system interconnects all of the torches with the central reservoir, for example by connecting the torches in series, by connecting all of the torches to a central "hub" that is in liquid communication with the central reservoir, or by any other interconnection arrangement as is known in the art.

The automatic refueling system of the present invention enables the torches, in embodiments, to maintain smaller quantities of fuel in their local reservoirs, as compared to torches of the prior art that cannot be automatically refilled. As a result, any risks that might be associated with fuel spills at the torches, such as risks of fire, and of health and environmental damage, are proportionately reduced. According to the specific features of an outdoor activity area, the torch or torches can be permanently installed, or they can be removably installed in holes or other permanent mountings provided in an underlying surface, or in removable bases 104 that can be filled with sand or water to increase weight and stability. Embodiments provide disconnect fittings that enable the torches and/or poles or other associated support structures to be disconnected from the fuel plumbing system and removed as needed.

The fuel plumbing system can be installed underground, for example in trenches or conduits provided below ground. In other embodiments, the fuel plumbing system is provided either partially or completely above ground. For example, conduits containing fuel lines of the plumbing system can be cooperative with structures such as decks, fences, railings, and benches that are included in the outdoor activity area, so that tripping hazards are avoided. Embodiments include sensing systems that are run in parallel with the fuel plumbing system, for example within fuel plumbing trenches and/or conduits, and are configured to detect any leakage of fuel from the fuel plumbing system.

Embodiments include a controller that automatically maintains the fuel in the local reservoirs of the torches by activating a pump, thereby causing fuel to flow from the central reservoir to the local reservoirs of the torches. In some embodiments a fuel pressure is maintained in the fuel plumbing system only while the local reservoirs of the torches are being refilled. In other embodiments, a fuel pressure is maintained in the fuel plumbing system at all times when the system is in use, and in some of these embodiments local controllers and valves are implemented in each torch that maintain the fuel in the local reservoirs.

In some "gravity fed" embodiments the fuel is pumped from the central reservoir into an elevated tank that can be located near the central reservoir and is in direct liquid communication with the local reservoirs. In some of these embodiments, the elevated tank is maintained at an elevation that is higher than the torches, so that sufficient fuel pressure is maintained in the fuel plumbing system to deliver fuel to the local reservoirs.

In other gravity fed embodiments, the elevated tank is maintained at an elevation that corresponds with the heights of the local reservoirs. According to this approach, it is not necessary to include separate valves and level sensors in each of the torches. Instead, the levels of fuel in all of the local reservoirs will mimic and correspond with the level of fuel in the elevated tank, such that monitoring and controlling the level of fuel in the elevated tank will automatically cause the fuel levels in the local reservoirs to be maintained. This approach is applicable, in particular, when all of the torches are installed at the same height.

In still other embodiments each of the torches includes a remotely controlled valve and one or more level sensors that monitor a level of the fuel in the local reservoir. In these embodiments, fuel is maintained under pressure in the fuel plumbing system, for example directly by operation of a pump or indirectly by elevating the central reservoir or by implementing an elevated tank as described above. A central controller and/or separate controllers included in each of the torches monitor the fuel levels in the local reservoirs and open the local valves as needed to allow the pressurized fuel to flow from the fuel plumbing system into the local reservoirs. Power for the operation of the controller(s), sensors, and valves can be provided from a central source through an ethernet cable (power over ethernet) or separate power lines run in parallel with the fuel plumbing system. For example, power can be supplied from a transformer at a relatively low voltage from an outdoor low voltage power supply that meets National Electrical Code (NEC) NFPA 70 for safe electrical design and installation, as is adopted in all 50 states of the United States. In other embodiments, power is provided locally to each torch by batteries and/or by solar power.

Embodiments further include manual or remotely activated wick advancers that control the heights of the wicks in the combustion areas of the torches, and thereby control the rate of burning of the fuel, including extinguishing the torches when use of the outdoor recreation area has ceased. Embodiments can include remotely controlled wick seals that can inhibit fuel spillage from the local reservoirs and prevent air from entering torch interiors, thereby preventing combustion from occurring within the torches. In various embodiments, the wick seals are cooperative with the wick advancers. In some embodiments the wick is lit manually by a user, while other embodiments include manual or remotely activated ignitors that can be used to initiate burning of fuel by the torches.

In various embodiments, the central controller is in wireless communication with the local controllers, and in some embodiments the central controller and/or local controllers are able to communicate via cellular communication and/or via the internet, so that operation of the system, including ignition, rate of burning, torch extinguishing, and/or fuel level monitoring, thereby causing the disclosed torch system to be a part of the Internet of Things (IoT).

In embodiments, a plurality of systems as described above can be configured for control by a single, combined control system, such as a single software application or family of applications running in the "cloud," whereby a computing device such as a laptop computer or hand-held device can monitor and control the functions of all of the systems.

The present invention is a system that is able to repel insects from an outdoor activity area. The system includes a central fuel reservoir configured to contain a combustible liquid fuel, at least one torch, each of said torches having a substantially enclosed interior and a local fuel reservoir located within said interior, the local fuel reservoir being configured to contain a local quantity of said fuel, each of said torches further comprising a combustion area exterior to the torch and configured for burning said fuel when drawn from said local quantity into said combustion area, a fuel plumbing system comprising hoses that are configured to convey said fuel from the central fuel reservoir to the local reservoirs of each of said torches, and a refueling system configured to cause the fuel to flow from the central reservoir through the fuel plumbing system to the local fuel reservoirs of each of the torches, the local fuel reservoirs being refilled thereby, wherein the torches, while interconnected with each other and with the central reservoir by the fuel plumbing system, are otherwise structurally independent and separate from each other and from the central reservoir.

In embodiments, the system includes a plurality of the torches.

In any of the above embodiments, the refueling system can be configured to automatically replenish the fuel in the local fuel reservoirs during said burning of said fuel.

In any of the above embodiments, at least one of the torches can further include a wick extending from the local fuel reservoir of the torch to the combustion area, the wick being configured to draw the fuel from the local fuel reservoir of the torch to the combustion area of the torch by wicking. Some of these embodiments further include a wick seal that surrounds the wick and inhibits air from entering the interior of the torch, wherein the wick seal can be sealed and unsealed under remote control. And in any of these embodiments a level of the wick in the combustion area can be automatically adjustable under remote control.

In any of the above embodiments, at least one of the torches can include an ignitor configured to electrically initiate the burning of the fuel in the combustion area of the torch.

In any of the above embodiments, the refueling system can include an elevated tank that is interconnected by the fuel plumbing system with the local reservoir of at least one of the torches, so that a fuel level in the local fuel reservoir of the torch is gravitationally maintained at a level that is equal to a fuel level within the elevated tank.

In any of the above embodiments, the refueling system can be configured to maintain the fuel within the fuel plumbing system at a pressure above ambient pressure, and each of the torches can include a level sensor and a fuel valve that are in communication with a controller, said controller being configured to monitor a level of the fuel in the local reservoir of the torch and to cause the valve to open as needed to maintain a level of the fuel in the local reservoir of the torch within specified limits by allowing the fuel to flow from the fuel plumbing system into the local reservoir.

In any of the above embodiments, the fuel plumbing system can include at least one plumbing interconnection configured to enable disconnection of the fuel plumbing system from the torch and/or disconnection of a portion of the fuel plumbing system from a remainder of the fuel plumbing system.

In any of the above embodiments, the system can further include at least one of a conduit and a trench configured to convey a portion of the fuel plumbing system below grade from the central fuel reservoir to at least one of the local fuel reservoirs.

Any of the above embodiments can further include a support structure configured to support one of the torches, the support structure comprising a support base, the support base comprising at least one plumbing port configured to allow one of the hoses of the fuel plumbing system to enter an interior of the base through the plumbing port, the base further comprising a plumbing interconnector within its interior configured to interconnect the hose that enters the interior of the base through the plumbing port with another of the hoses of the fuel plumbing system that extends from the base to the torch. In some of these embodiments, the base includes a plurality of plumbing ports, and the plumbing interconnector is configured to interconnect a plurality of the hoses of the fuel plumbing system that enter the interior of the base through the plurality of plumbing ports.

In any of the above embodiments, electrical operation power can be conveyed to at least one of the torches by wires that are routed to the torch together with a hose of the fuel plumbing system. In some of these embodiments, the electrical operation power is supplied by an outdoor low voltage power supply that meets United States National Electrical Code (NEC) NFPA 70 for safe electrical design and installation.

In any of the above embodiments, electrical operation power can be provided to at least one of the torches by a battery that is cooperative with the torch. In some of these embodiments, the torch includes a solar collection device that is configured to recharge the battery using solar power.

In any of the above embodiments, at least one of the torches can include a local controller that is cooperative with the torch and is configured to control and/or monitor at least one feature of the torch. In some of these embodiments the local controller is configured for wireless communication with a remote computing device.

Any of the above embodiments can further include a central controller that is configured to automatically control and/or monitor at least one feature of the system.

Any of the above embodiments can be configured such that at least one feature of the system can be controlled and/or monitored by software operating on a remote computing device via wireless communication. In some of these embodiments the software is able to control and/or monitor a plurality of systems as described in any of the above embodiments.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2C is a perspective view of an outdoor activity area similar to FIG. 2A except that the fuel plumbing system interconnects the torches in a mixed series and star configuration;

DETAILED DESCRIPTION

The present invention is an apparatus and method of repelling insect pests away from an outdoor activity area that does not require direct application of chemicals to the skin, and that can continue to repel insects with undiminished effectiveness for extended periods of time without user maintenance.

Figure 1:
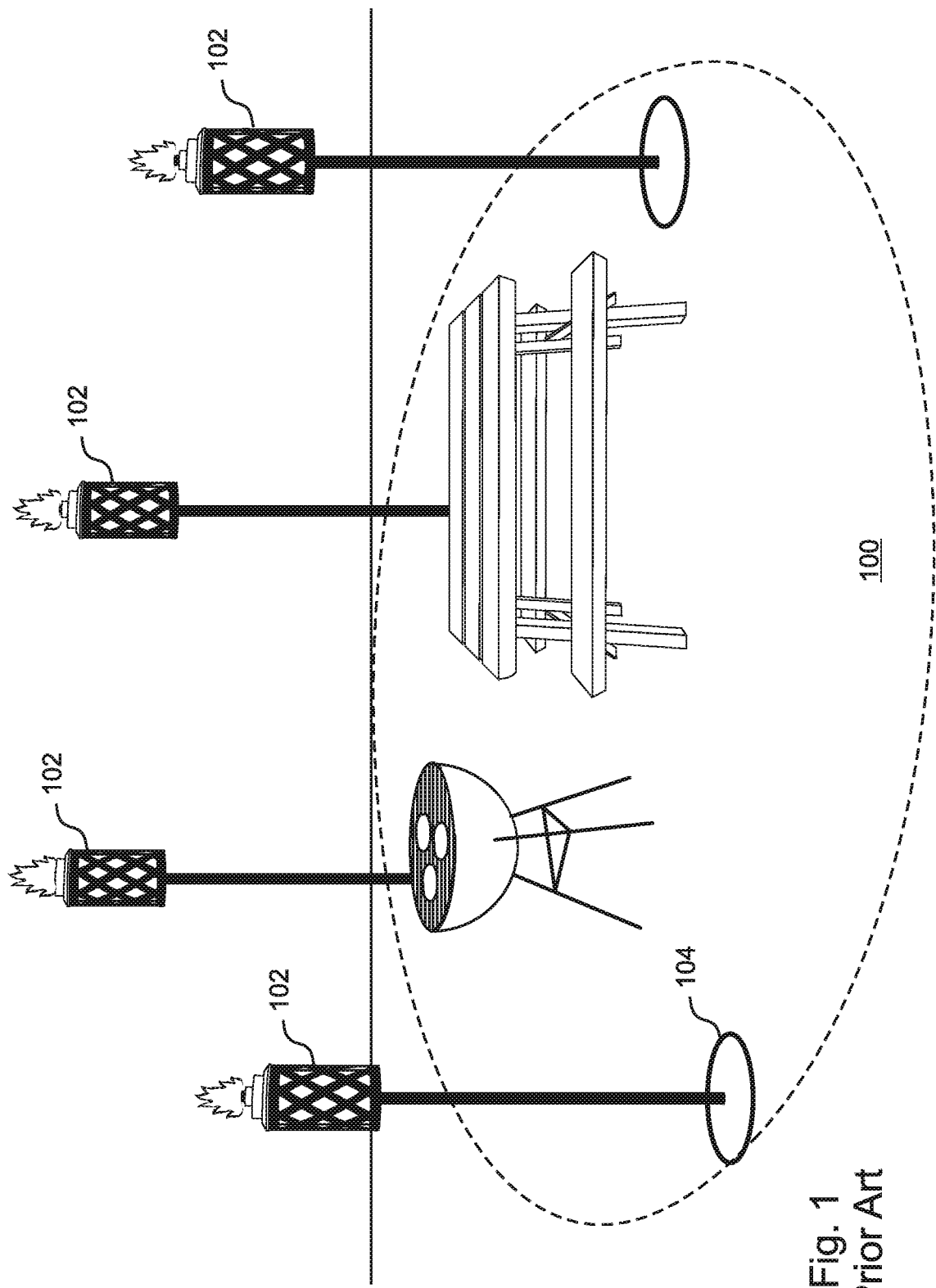
FIG. 1 illustrates use in the prior art of torches that burn a fuel mixed with an insect repellant to exclude insect pests from an outdoor activity area, where the torches are self-contained and cannot be refilled with fuel while burning or while hot from recent use.
Figure 2A:
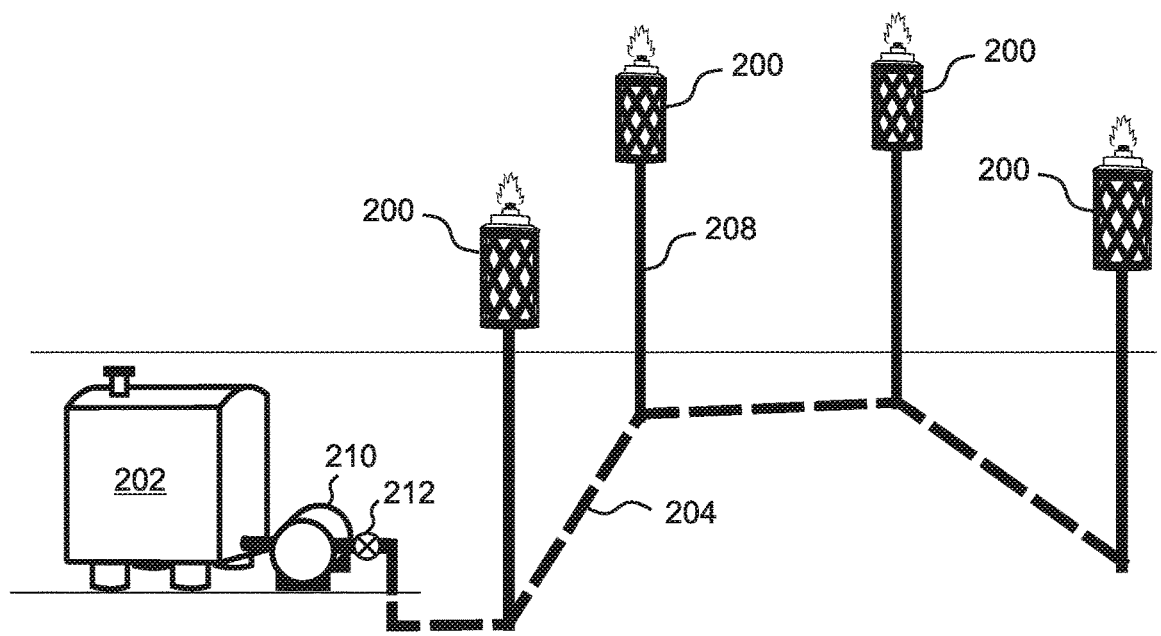
FIG. 2A is a perspective view of an outdoor activity area surrounded by torches according to an embodiment of the present invention where the fuel plumbing system interconnects the torches in series.
Figure 2B:
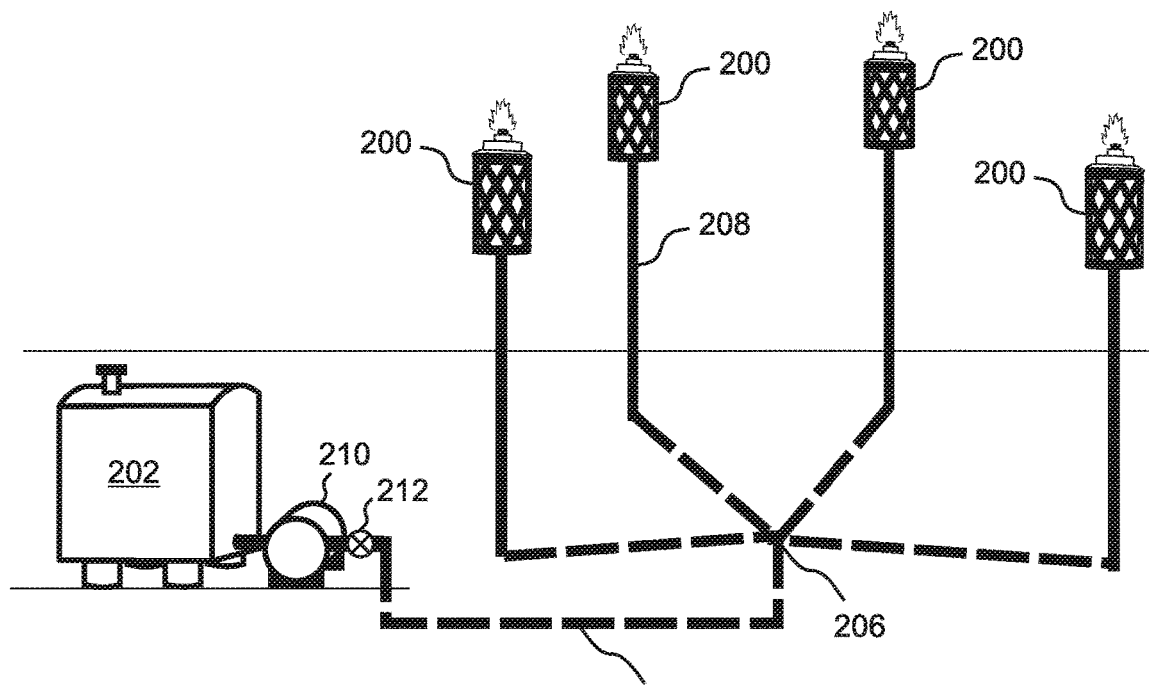
FIG. 2B is a perspective view of an outdoor activity area similar to FIG. 2A except that the fuel plumbing system interconnects the torches to a common hub in a "star" configuration.

With reference to FIGS. 2A through 2C, the apparatus of the present invention is a system that includes at least one fuel-burning torch 200, where all of the torches are in fluid communication via a fuel plumbing system 204 with a central reservoir 202 of fuel. In embodiments that include a plurality of torches 200, the fuel plumbing system 204 interconnects all of the torches 200 with the central reservoir 202, for example by connecting the torches 200 in series, as shown in FIG. 2A, by connecting all of the torches 200 to a central "hub" 206, as shown in FIG. 2B, by a combination thereof, as shown in FIG. 2C, or by any other plumbing configuration known in the art that can supply fuel from the central reservoir 202 to the torches 200. As indicated in FIGS. 2A through 2C, the fuel plumbing system 204 can be partially or fully installed in trenches or conduits that are below ground and/or under or within a cement slab or other foundation.

An automatic fuel refueling system refuels the torches 200 from the central reservoir 202 as needed, either be elevating the central reservoir to a height that is above the torches, or by using a pump 210 to deliver fuel to the torches 200, so that the torches 200 can continue burning almost indefinitely. A valve 212 can be included proximal to the pump 210 and/or central reservoir 202, which can be or can include a one-way valve that prevents fuel from flowing from the fuel plumbing system 204 back through the pump 210 when the pump 310 is not operating.

By mixing an insect repellent substance such as citronella with the fuel that is supplied to the torches 200, the disclosed apparatus and method can be used to repel insect pests away from areas 100 that are proximal to the torches 200 for very long periods of time. A period of protection can be extended even further by re-filling the central reservoir 202 with fuel, where said refueling can be performed while the torches 200 are in operation.

Figure 3:
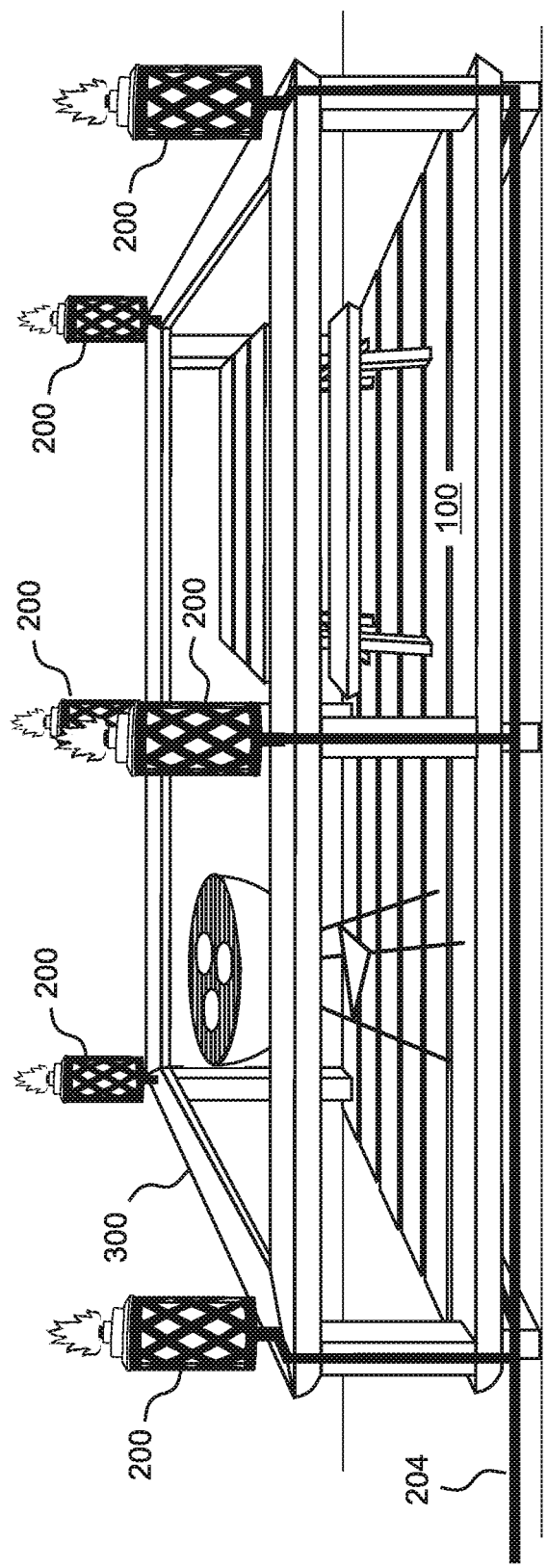
FIG. 3 is a perspective view of an embodiment of the present invention where the torches are mounted to railing structures included in an outdoor activity area.

With continuing reference to FIGS. 2A through 2C, the torches 200 can be mounted on poles 208 or other structures that can be permanently deployed in the ground, or for example in a cement slab, or the poles 208 can be removably mounted in holes or other permanent support structures that are provided in the outdoor recreation area 100, or on removable stands 104 that can be filled with sand or water to increase their weight and stability. In other embodiments, with reference to FIG. 3, the fuel plumbing system 204 is provided either partially or completely above ground. For example, conduits containing fuel lines of the plumbing system can be cooperative with structures such as decks, fences, railings 300, and benches that are included in the outdoor activity area 100, so that tripping hazards are avoided.

Figure 4A:
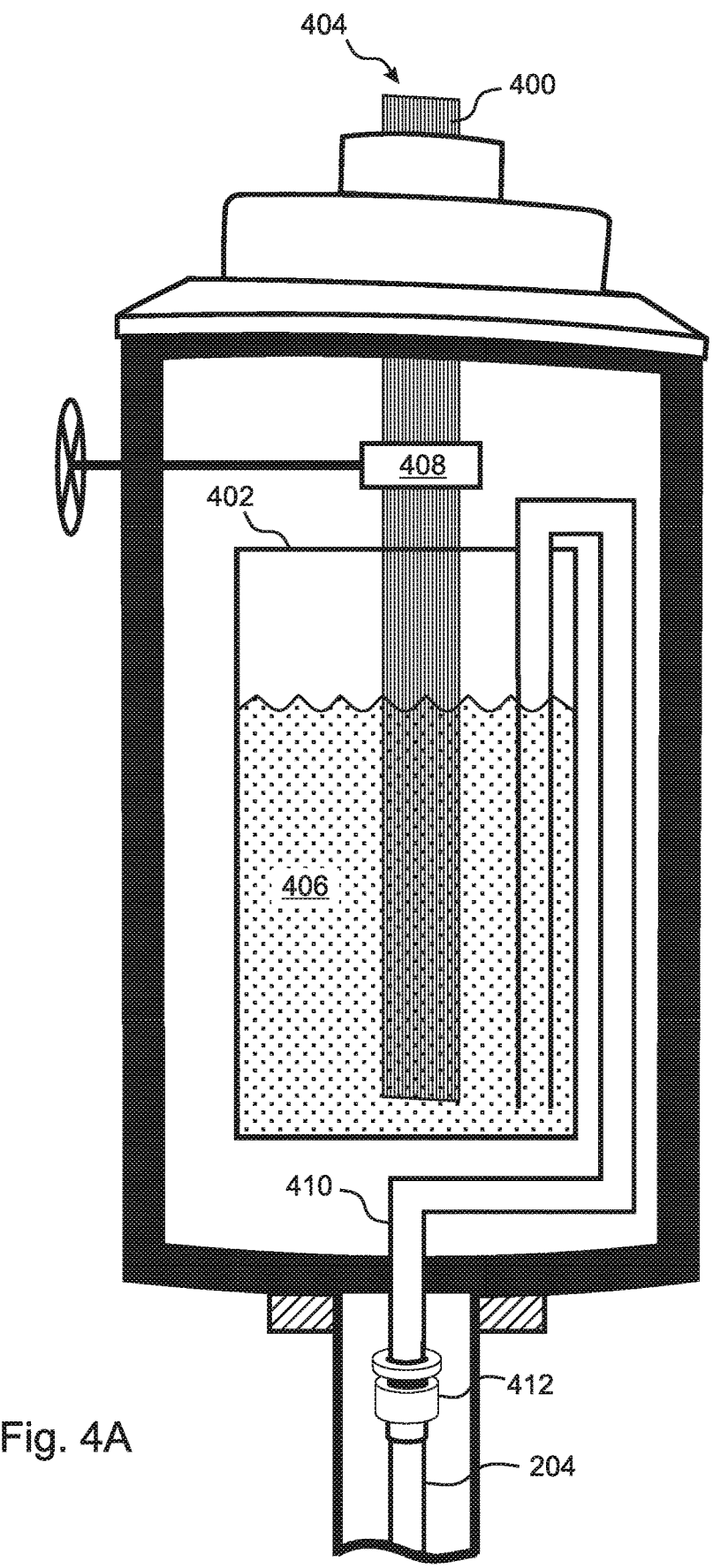
FIG. 4A is cross-sectional view of a torch in an embodiment where fuel is gravitationally supplied to the local reservoir from a remote elevated tank, and wherein the fuel enters the local reservoir from above.
Figure 4B:
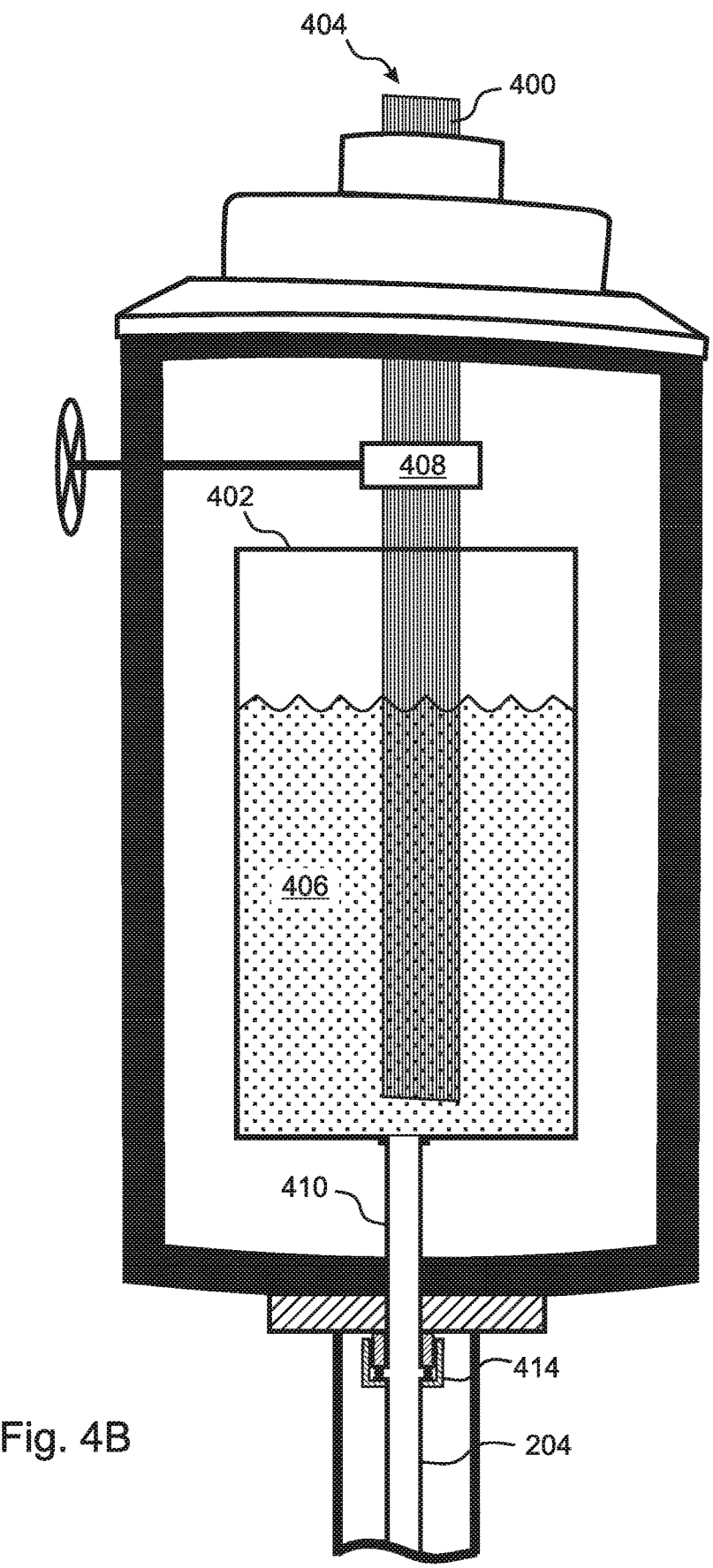
FIG. 4B is a cross-sectional view of a torch similar to FIG. 4A, but wherein the fuel enters the local reservoir from below.
Figure 4C:
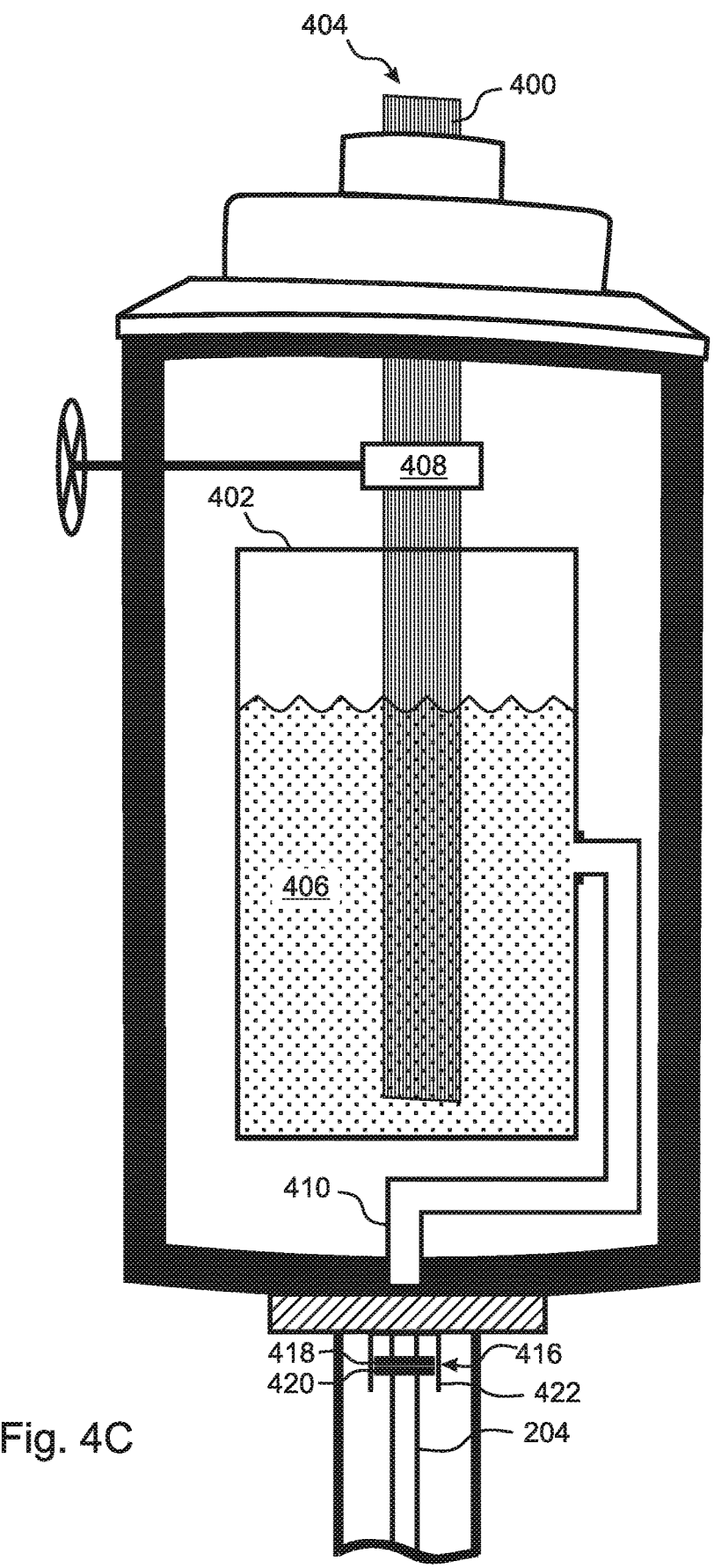
FIG. 4C is a cross-sectional view of a torch similar to FIG. 4A, but wherein the fuel enters the local reservoir through a side of the local reservoir.

With reference to FIGS. 4A-4C, each of the torches 200 includes a wick 400 that extends from a local fuel reservoir (the "local reservoir") 402 to a combustion area 404. When in use, as the fuel 406 is burned and consumed in the combustion area 404, the wick 400 draws additional fuel 406 as needed from the local fuel reservoir 402. The embodiments of FIGS. 4A-4C further include a wick height adjuster 408 that controls a height of the wick 400 in the combustion area 404, and in that way controls the rate at which fuel 406 is burned by the torch 200. For example, the wick height adjuster 408 can include one or more rollers that are pressed against the wick 400 and operate when rotated to apply an upward or downward axial force to the wick 400. In embodiments, the wick height adjuster 408 can also stop the combustion of fuel by the wick 400 by withdrawing the wick 400 into the torch so that sufficient air does not reach the wick 400 to support combustion. In the embodiments of FIGS. 4A-4C, the wick height adjuster 408 is manually operated. In other embodiments the wick height adjuster 408 is automatically controlled, as is discussed in more detail below with reference to FIGS. 7A through 7D.

The fuel line 412 within the torch 200 that delivers fuel from the fuel plumbing system 204 to the local reservoir 402 can enter the local reservoir 402 from above, as shown in FIG. 4A, from below, as shown in FIG. 4B, or from the side, as shown in FIG. 4C. In the embodiments of FIGS. 4B and 4C, the fuel line 412 is a metal tube that is welded to the local reservoir 402 to prevent any fuel from potentially leaking from a juncture between the fuel line 412 and the local reservoir 402. The fuel line 412 in FIG. 4A can be made of any material that is suitable for exposure to combustible fuels and that will not be harmed by any heat to which it might be exposed at the top region of the local reservoir 402.

Embodiments include plumbing disconnection features such as a mechanical "quick connect" feature 412 as shown in FIG. 4A, a screw and washer fittings 414 as shown in FIG. 4B, or a magnetic attachment feature 416 as shown in FIG. 4C. In the embodiment of FIG. 4C the connection between the internal fuel line 412 and the fuel plumbing system 204 is formed between a first magnet 418 that is sealed to the internal fuel line 412 and a second magnet 410 that is sealed to a hose of the fuel plumbing system 204, alignment between the magnets 418, 420 being maintained by a non-magnet collar 422. These and similar fittings enable the fuel plumbing system 204 in embodiments to be disconnected and reconnected at various locations, such as the tops and/or the bases of support poles 208.

The automatic refueling system of the present invention enables the torches 200, in embodiments, to maintain smaller quantities of fuel 406 in their local reservoirs 402, as compared to torches 102 of the prior art that cannot be automatically refilled. As a result, any risks that might be associated with fuel spills at the torches 200, such as risks of fire, and of health and environmental damage, are proportionately reduced.

In some "gravity fed" embodiments the central reservoir 202 is provided at an elevated location, so that it is not necessary to pump the fuel to the torches 200. In other gravity fed embodiments fuel is pumped into an elevated tank 506, which can be located near the central reservoir 202, that is in direct liquid communication via the fuel plumbing system 204 with the local reservoirs 402 of the torches 200, and is maintained at an elevation that is higher than the torches 200, so that sufficient fuel pressure is maintained in the fuel plumbing system 204 to deliver fuel 406 to the local reservoirs 402.

Figure 5:
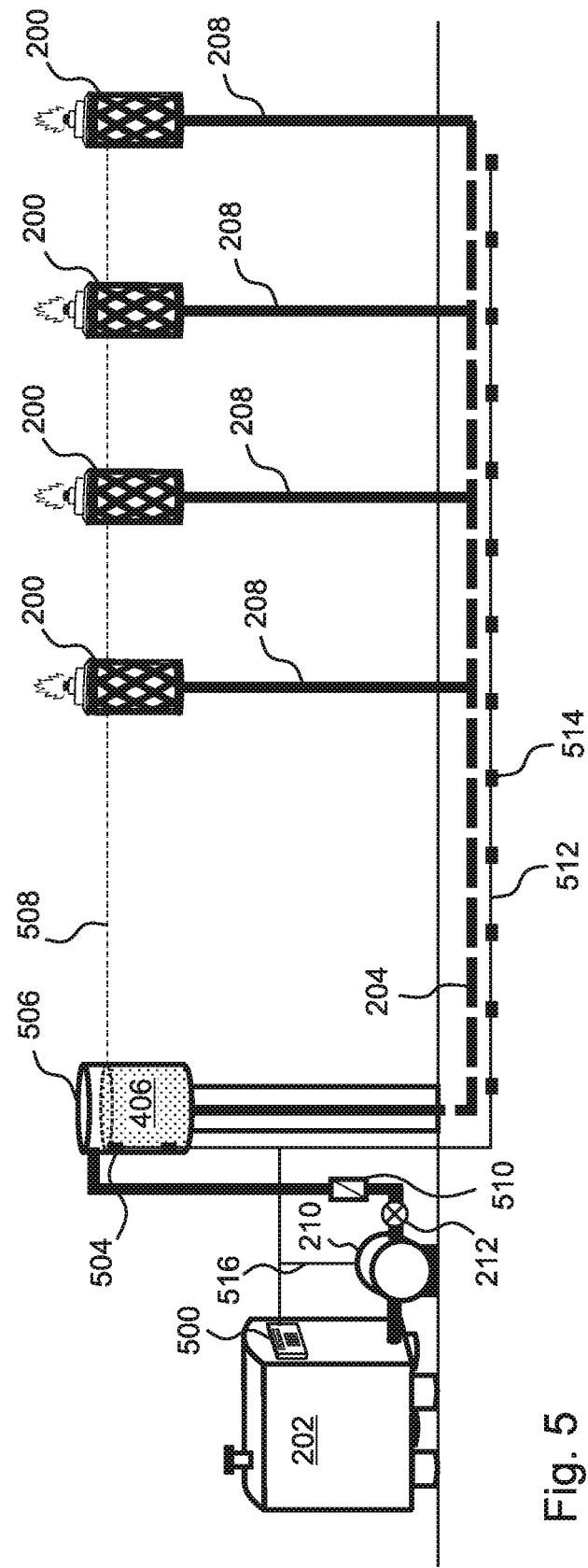
FIG. 5 is a side view of an embodiment of the present invention in which fuel is gravitationally supplied to the local reservoir from a remote elevated tank

In the gravity fed embodiment of FIG. 5, the elevated tank 506 is maintained at an elevation that corresponds with the heights of the local reservoirs 402. According to this approach, it is not necessary to include separate valves and level sensors in each of the torches 200. Instead, the levels 508 of fuel 406 in all of the local reservoirs 402 will mimic and correspond with the level 508 of fuel 406 in the elevated tank 506, such that monitoring and controlling the level 508 of fuel 406 in the elevated tank 506 using sensors 504 in the elevated tank 506 will automatically cause the fuel levels 508 in the local reservoirs 204 to be maintained. This approach is applicable, in particular, when all of the torches 200 are installed at the same height. In addition to a shut-off valve 212, the embodiment of FIG. 5 further includes a check valve 510 that prevents fuel from flowing from the fuel plumbing system 204 back through the pump 210 when the pump 210 is not in operation.

A fuel leakage sensing system 512 is also provided in the embodiment of FIG. 5 that includes a plurality of sensors 514 in close proximity to the hoses of the fuel plumbing system 204. For example, the fuel leakage sensing system 512 can be located within a trench or conduit through which hoses of the fuel plumbing system 204 are routed. If a fuel leak is detected, the controller 500 is immediately alerted by the fuel leakage sensing system 512, and responds by alerting a user and by interrupting the power 516 that is supplied to the pump 210, thereby stopping operation of the pump 210. If a trench or conduit is used, the trench or conduit can serve to prevent escape of any small amount of fuel that might have leaked before the pump was stopped. Embodiments include additional remotely-controlled valves (not shown), for example at the bases of torch support structures and/or the base of the support structure of the elevated tank 506, that can be closed in the event of a fuel leak to prevent fuel contained in the local reservoirs 402, elevated tank 506, or any other part of the fuel plumbing system 204 from flowing out through the leak.

Figure 6A:
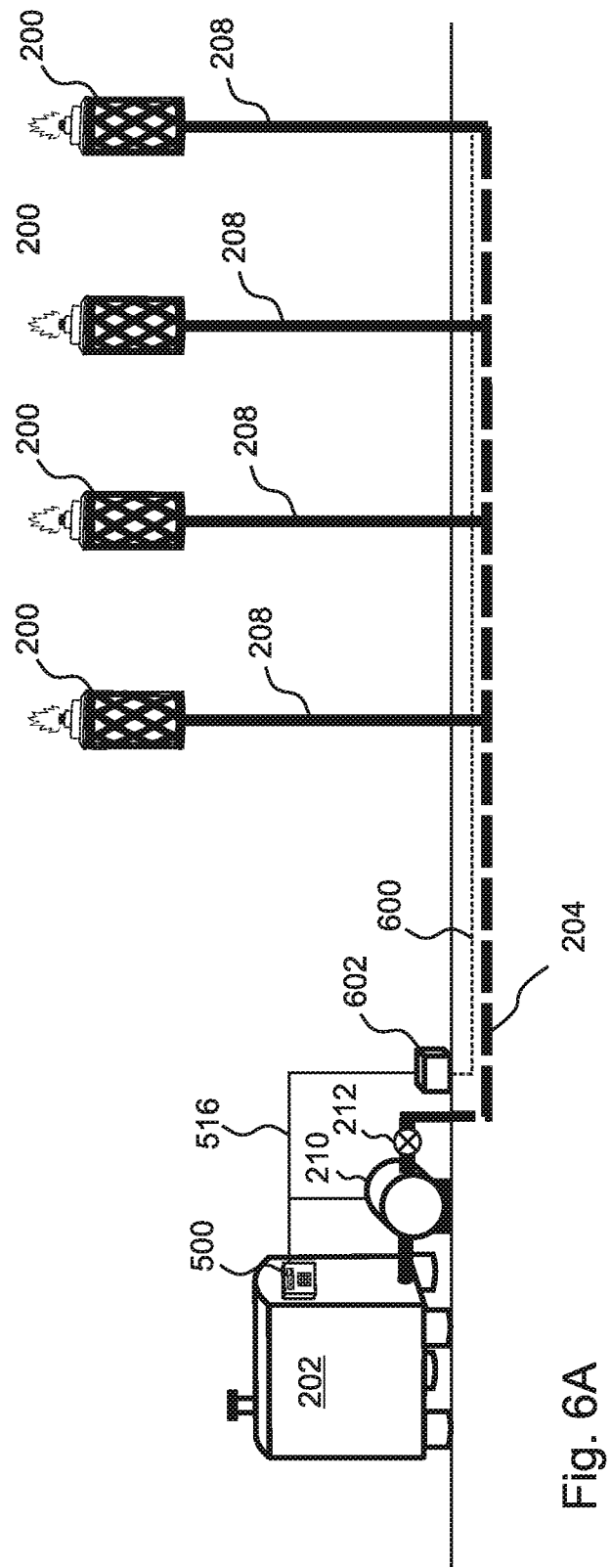
FIG. 6A is a side view of an embodiment of the present invention in which fuel is maintained under pressure in the fuel plumbing system by a pump, and each torch includes a level sensor and electrically controlled valve that is opened to refill the local reservoir as needed.
Figure 7A:
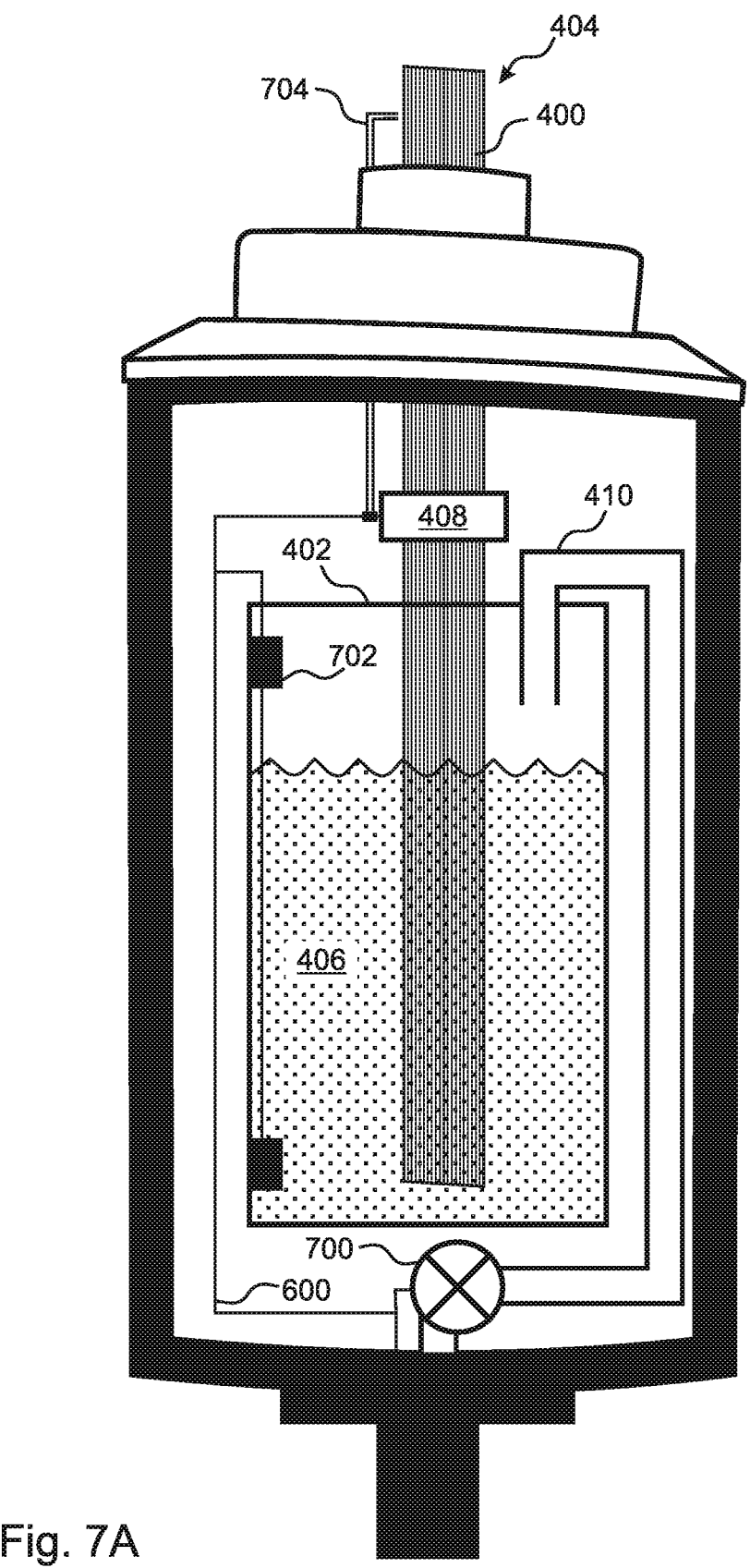
FIG. 7A is a cross-sectional view of a remotely powered torch that includes a level sensor and electrically controlled valve that is opened to refill the local reservoir as needed.

With reference to FIGS. 6A and 7A, in other embodiments each of the torches 200 includes a local valve 700 and one or more level sensors 702 that monitor the fuel 406 in the local reservoir 402. In these embodiments, fuel is maintained under pressure in the fuel plumbing system 204 so that the local reservoir 402 is refilled whenever the local valve 700 is opened. In some embodiments, such as FIG. 7A, the level sensors 702 in the torches 200 communicate with a central controller 500, which can be located proximate to the central reservoir 202, and the central controller 500 transmits signals to the torches 200 which open and close the local valves 700 in the torches as needed to maintain fuel in the local reservoir 402. Signal lines 600 that extend from within each torch 200 to the central controller 500 in parallel with the fuel plumbing system 204 direct signals from the level sensors 700 to the central controller 500, and also direct control signals from the central controller 500 to an automatic wick height adjuster 408. In embodiments, the signal lines 600 can include, or can be, an ethernet cable, and in some embodiments power is provided to the torches via an ethernet cable using "power over ethernet."

In some embodiments the wicks of the torches are lit manually by a user, while other embodiments include manual or remotely activated ignitors. The embodiment of FIG. 7A includes an automatic wick igniter 704 that functions to ignite the wick 400 under control of the central controller 500. Note that, in embodiments, the central controller 500 includes internet and/or cellular communication capabilities, so that all of the automated features of the torch system can be controlled remotely by a computer, and/or via an application running on a computer and/or a hand-held device. In embodiments, the entire torch system thereby becomes part of the Internet of Things" (IoT).

Figure 6B:
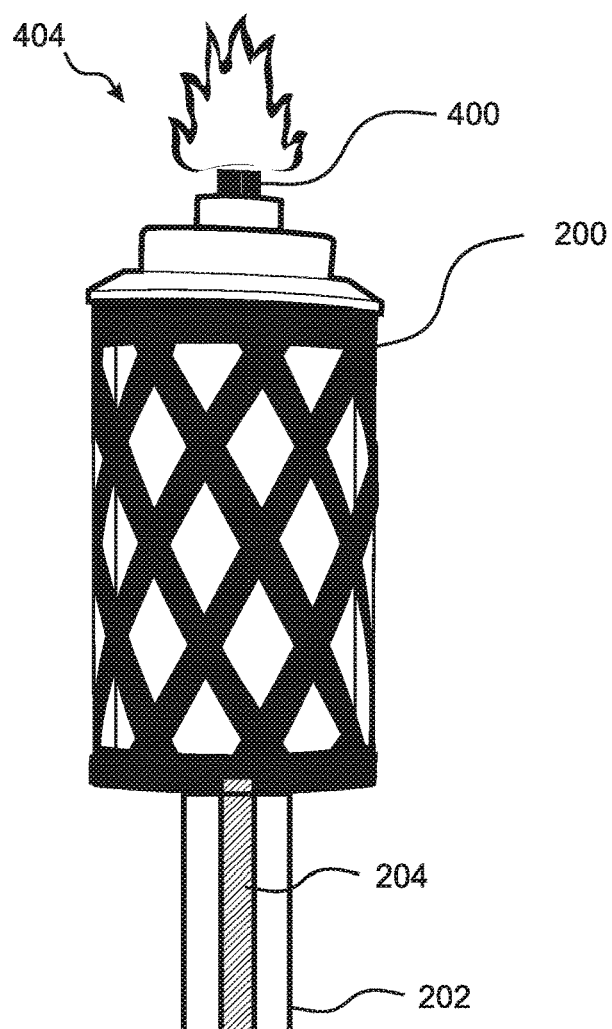
FIG. 6B is a side view of a torch in an embodiment of the present invention in which the torch is supported by a pole installed in an above-ground stand having ports and an internal fitting that accommodate the fuel plumbing system.
Figure 6B:
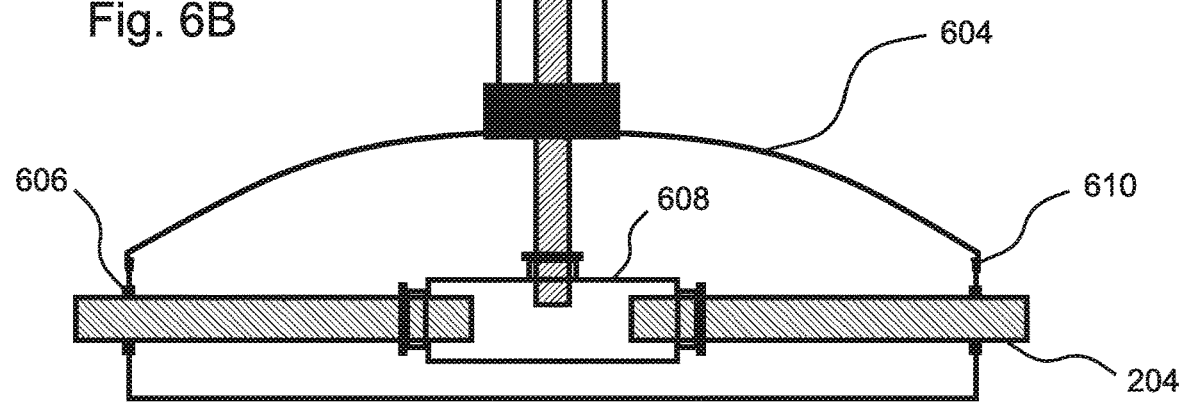

FIG. 6B is a close-up view of a torch 200 mounted on a pole 204 that is supported by a base 604. The base 604 includes ports 606 through which pipes of the fuel plumbing system 204 enter the interior of the base 604, where they are joined together by a fitting 608. In the illustrated embodiment, the base includes two ports 604, and the fitting 608 is a "T" fitting 608 that interconnects three pipes of the fuel plumbing system 204, including the pipe that extends up through the pole 202 to the torch 200. Other bases 604, for example a base that terminates a series of torches 200, only include a single port 604 and an "L" fitting that interconnects only two pipes of the fuel plumbing system 204. According to the embodiment, other torch bases include more than two ports 604 and fittings 608 that accommodate more than three pipes. The fitting 608 shown in FIG. 6B is of the "popfitting" type. Other embodiments include screw fitting, magnetic fittings, and/or any other types of plumbing interconnection fittings as are known in the art, including fittings that create permanent interconnections such as soldered fittings and fittings that attach to pipes via adhesives. In the illustrated embodiment, the base 604 includes a top that is attached by threads 610 and can be removed to gain access to the fitting 608 and pipes within the base 604.

In the embodiment of FIGS. 6A and 7A, low voltage power for operating the local valve 700, automatic height adjuster 408, and automatic wick igniter 704 is provided by a transformer 602 proximal to the pump 210 at a relatively low voltage from an outdoor low voltage power supply that meets National Electrical Code (NEC) NFPA 70 for safe electrical design and installation, as is adopted in all 50 states of the United States. The low voltage power can be directed through a low voltage power line 600 to the torches 200 in parallel with the pipes and/or trenches of the fuel plumbing system 204.

Figure 7B:
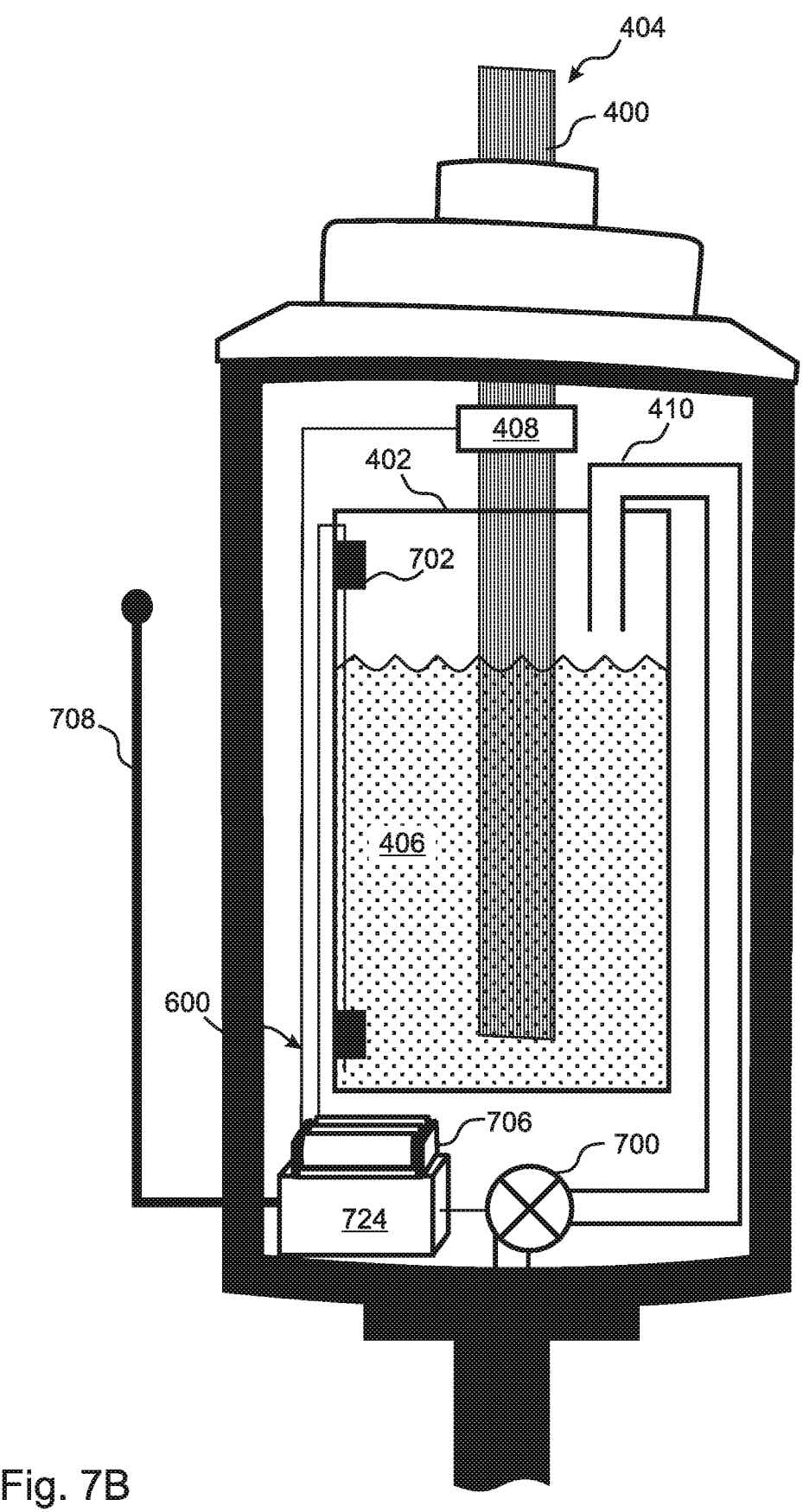
FIG. 7B is a cross-sectional view of a battery powered torch that includes a level sensor and electrically controlled valve that is opened to refill the local reservoir as needed.

In similar embodiments, power is provided to the torches through an ethernet cable (power over ethernet) that is routed in parallel with the fuel plumbing system 204. In the embodiment of FIG. 7B, low voltage power is provided to the valves 700 and other powered components by batteries 706 that are installed in each of the torches 200. In the embodiment of FIG. 7B, a local controller 724 installed in each torch 200 is also powered by the batteries 706. The local controller 724 monitors the fuel level sensors 702 and causes the local valve 700 to open and close as needed to allow fuel from the fuel plumbing system 204 to maintain the fuel 406 in the local reservoir 402. In the illustrated embodiment, the local controller 724 is able to send and receive wireless signals via an antenna 708, for example via wireless internet and/or cellular communication, so that the local controller 724 is able to receive commands from a user, for example to adjust a fuel burning rate, or halt the burning of fuel by withdrawing the wick 400 from the combustion area 404 into the torch.

Figure 7C:
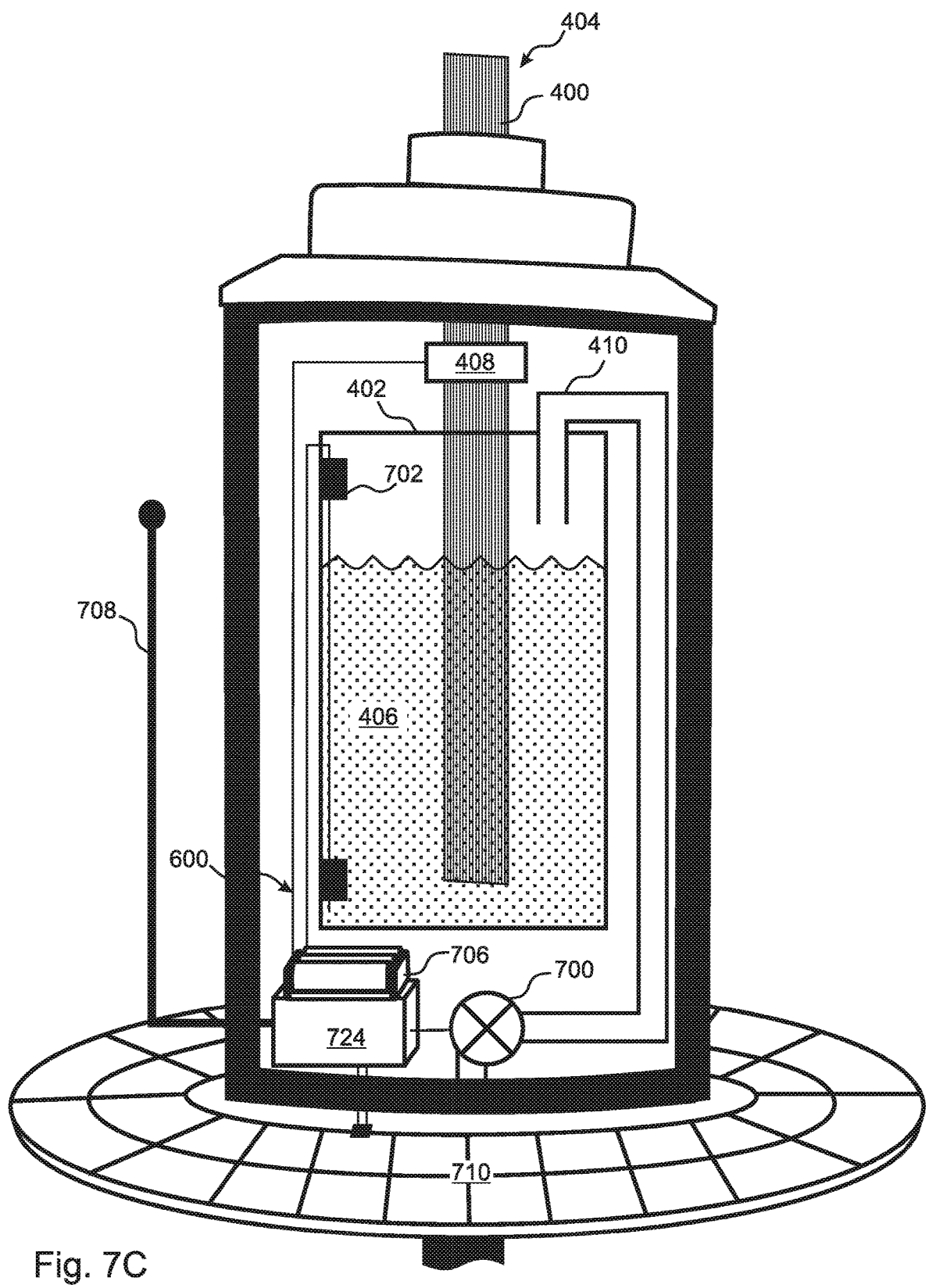
FIG. 7C is a cross-sectional view of a solar powered torch that includes a level sensor and electrically controlled valve that is opened to refill the local reservoir as needed.

FIG. 7C illustrates an embodiment that is similar to FIG. 7B, except that the batteries 706 are rechargeable, and the torch 200 further includes solar cells 710 that are configured to recharge the batteries 706.

Figure 7D:
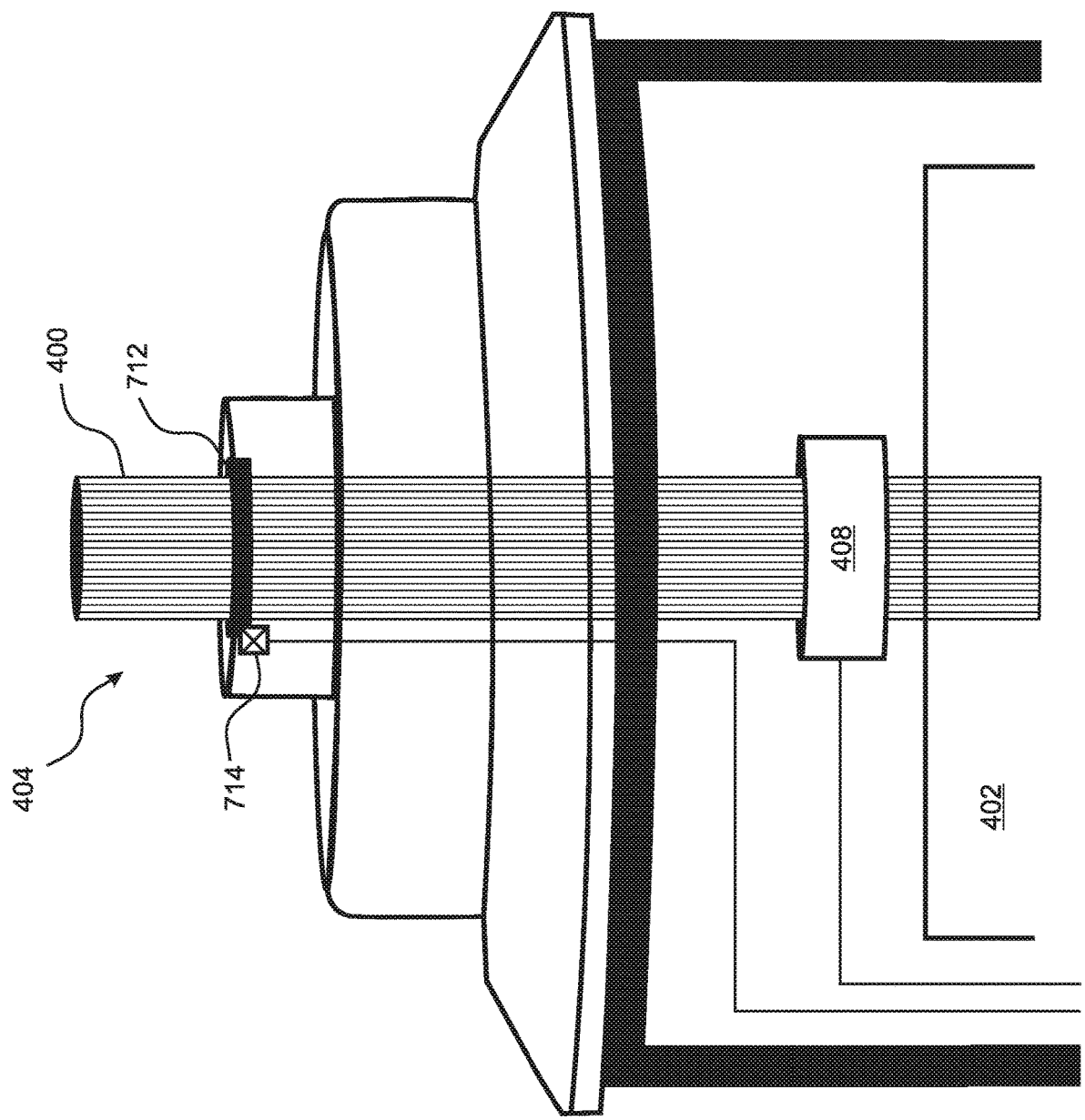
FIG. 7D is a close-up perspective view of the top of a torch in an embodiment of the invention that includes a split ring wick seal.
Figure 7E:
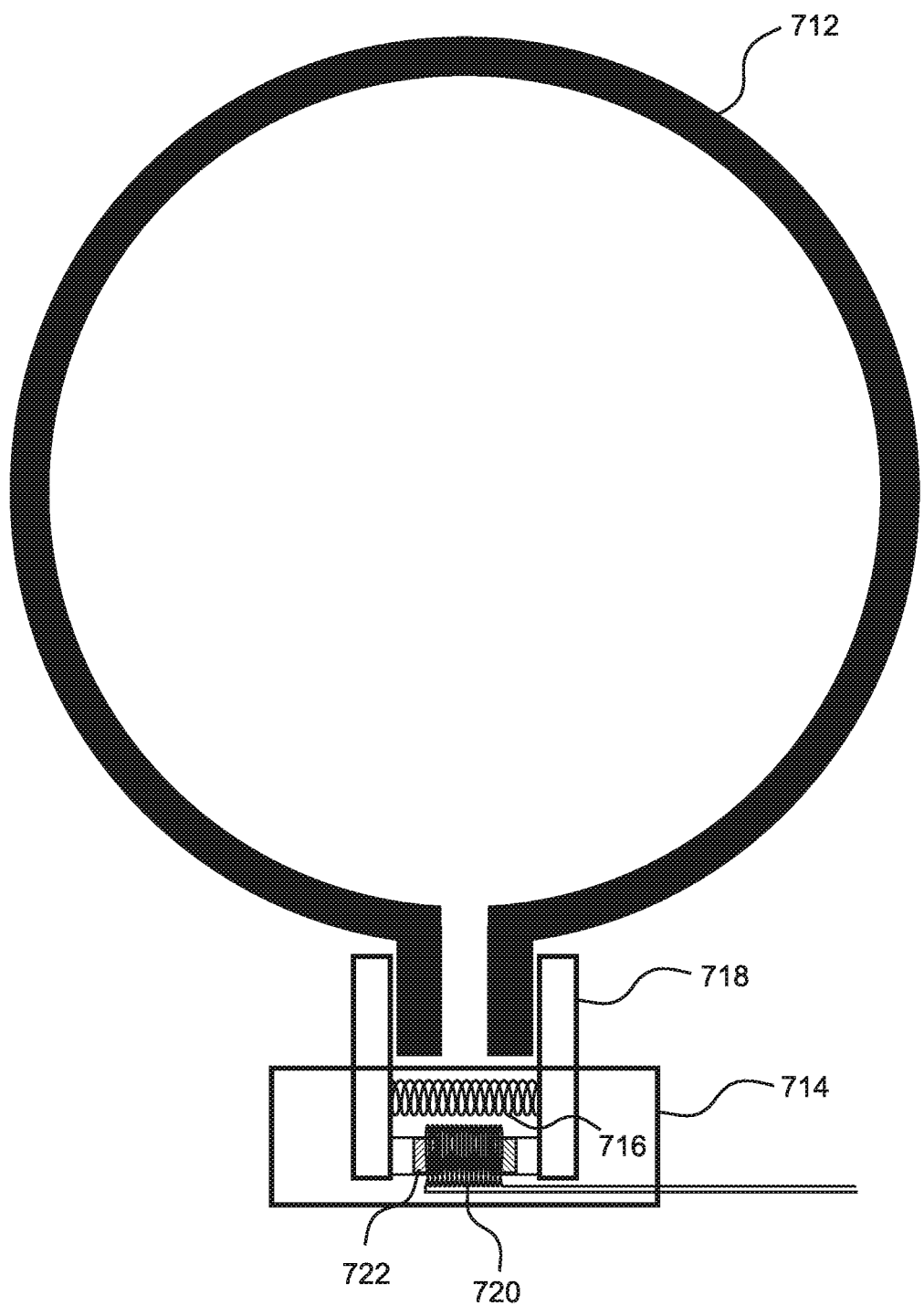
FIG. 7E is a close-up top view of the split-ring wick seal of FIG. 7D.

With reference to FIG. 7D, embodiments of the present invention include a remotely controlled wick seal 712 that forms an airtight or nearly airtight seal around the wick 400. The wick seal 712 reduces or eliminates any spillage of fuel from the internal reservoir 402 if the torch is tipped, and ensures that air does not enter the torch, thereby preventing any possible combustion of the fuel within the torch. In the embodiment of FIG. 7D, the wick seal 712 is a split-ring clamp that can be opened by a remotely controlled clamping mechanism 714. FIG. 7E is a close-up top view of the wick seal 712 and clamping mechanism 714 of FIG. 7D. In the illustrated embodiment, the split ring clamp of the wick seal 712 is normally held in a clamped configuration by a tension spring 716 acting on a pair of clamping arms 718. However, when adjustment of the height of the wick is desired, or for any other reason, the wick seal 712 can be temporarily released by passing electrical current through a coil 720, thereby attracting together a pair of magnets 722 that are also cooperative with the clamping arms 718, and overcoming the tension applied by the spring 716. In the embodiment of FIGS. 7D and 7E, the wick seal 712 is separate from the wick height adjuster 408.

Figure 8:
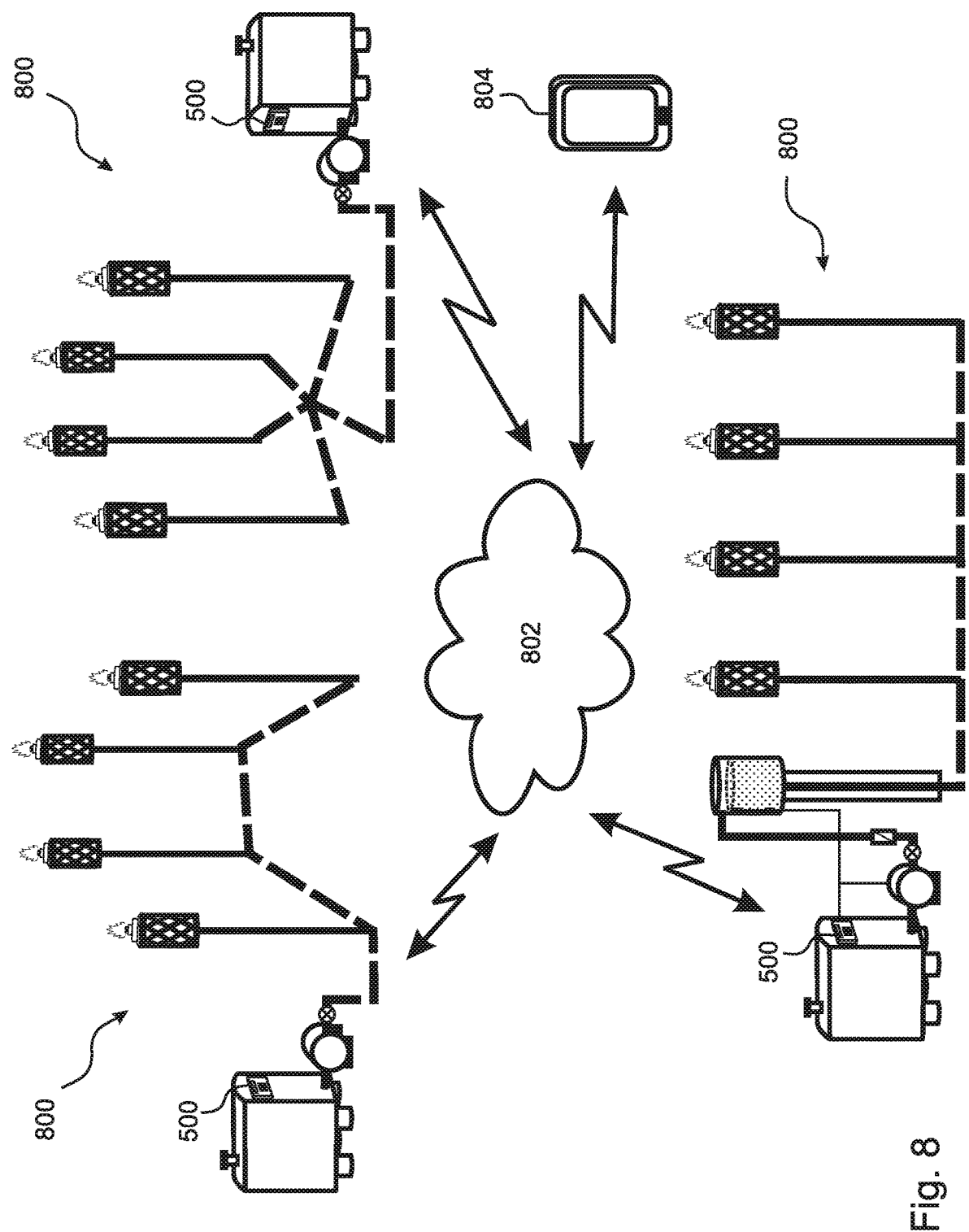
FIG. 8 illustrates a plurality of systems of the present invention that are controlled by a single application or family of applications running in the "cloud."

With reference to FIG. 8, in embodiments a plurality of systems 800 as described above can be configured for control by a single, combined control system, such as a single software application or family of applications running in the "cloud" 802 whereby a computing device 804 such as a laptop computer or hand-held device can access the central controllers 500 and/or local controllers of the systems 800 and thereby monitor and control some or all of the functions of the systems.

It should be noted that, except for the interconnection that is provided by the fuel plumbing system 204, the torches 200 of the disclosed system are structurally independent from each other and from the central reservoir, although electrical interconnections are provided in some embodiments that convey signals and/or electrical power to and from the torches 200.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

What is claimed is:

1. A system that is able to repel insects from an outdoor activity area, the system comprising:

a central fuel reservoir configured to contain a combustible liquid fuel;

at least one torch, each of said torches having a substantially enclosed interior and a local fuel reservoir located within said interior, the local fuel reservoir being configured to contain a local quantity of said fuel, each of said torches further comprising a combustion area exterior to the torch and configured for burning said fuel when drawn from said local quantity into said combustion area;

a fuel plumbing system comprising hoses that are configured to convey said fuel from the central fuel reservoir to the local reservoirs of each of said torches; and a refueling system configured to cause the fuel to flow from the central reservoir through the fuel plumbing system to the local fuel reservoirs of each of the torches, the local fuel reservoirs being refilled thereby;

wherein the torches, while interconnected with each other and with the central reservoir by the fuel plumbing system, are otherwise structurally independent and separate from each other and from the central reservoir;

and wherein the refueling system is configured to maintain the fuel within the fuel plumbing system at a pressure above ambient pressure, each of the torches including a level sensor and a fuel valve that are in communication with a controller, said controller being configured to monitor a level of the fuel in the local reservoir of the torch and to cause the valve to open as needed to maintain a level of the fuel in the local reservoir of the torch within specified limits by allowing the fuel to flow from the fuel plumbing system into the local reservoir.

2. The system of claim 1, wherein the system comprises a plurality of the torches.

3. The system of claim 1, wherein the refueling system is configured to automatically replenish the fuel in the local fuel reservoirs during said burning of said fuel.

4. The system of claim 1, wherein at least one of the torches further includes a wick extending from the local fuel reservoir of the torch to the combustion area, the wick being configured to draw the fuel from the local fuel reservoir of the torch to the combustion area of the torch by wicking.

5. The system of claim 4, further comprising a wick seal that surrounds the wick and inhibits air from entering the interior of the torch, wherein the wick seal can be sealed and unsealed under remote control.

6. The system of claim 4, wherein a level of the wick in the combustion area is automatically adjustable under remote control.

7. The system of claim 1, wherein at least one of the torches comprises an ignitor configured to electrically initiate the burning of the fuel in the combustion area of the torch.

8. The system of claim 1, wherein the refueling system includes an elevated tank that is interconnected by the fuel plumbing system with the local reservoir of at least one of the torches, so that a fuel level in the local fuel reservoir of the torch is gravitationally maintained at a level that is equal to a fuel level within the elevated tank.

9. The system of claim 1, wherein the fuel plumbing system includes at least one plumbing interconnection configured to enable disconnection of the fuel plumbing system from the torch and/or disconnection of a portion of the fuel plumbing system from a remainder of the fuel plumbing system.

10. The system of claim 1, wherein the system further comprises at least one of a conduit and a trench configured to convey a portion of the fuel plumbing system below grade from the central fuel reservoir to at least one of the local fuel reservoirs.

11. The system of claim 1, further comprising a support structure configured to support one of the torches, the support structure comprising a support base, the support base comprising at least one plumbing port configured to allow one of the hoses of the fuel plumbing system to enter an interior of the base through the plumbing port, the base further comprising a plumbing interconnector within its interior configured to interconnect the hose that enters the interior of the base through the plumbing port with another of the hoses of the fuel plumbing system that extends from the base to the torch.

12. The system of claim 11, wherein the base comprises a plurality of plumbing ports, and the plumbing interconnector is configured to interconnect a plurality of the hoses of the fuel plumbing system that enter the interior of the base through the plurality of plumbing ports.

13. The system of claim 1, wherein electrical operation power is conveyed to at least one of the torches by wires that are routed to the torch together with a hose of the fuel plumbing system.

14. The system of claim 13, wherein the electrical operation power is supplied by an outdoor low voltage power supply that meets United States National Electrical Code (NEC) NFPA 70 for safe electrical design and installation.

15. The system of claim 1, wherein electrical operation power is provided to at least one of the torches by a battery that is cooperative with the torch.

16. The system of claim 15, wherein the torch includes a solar collection device that is configured to recharge the battery using solar power.

17. The system of claim 1, wherein at least one of the torches includes a local controller that is cooperative with the torch and is configured to control and/or monitor at least one feature of the torch.

18. The system of claim 17, wherein the local controller is configured for wireless communication with a remote computing device.

19. The system of claim 1, further comprising a central controller that is configured to automatically control and/or monitor at least one feature of the system.

20. The system of claim 1, wherein at least one feature of the system can be controlled and/or monitored by software operating on a remote computing device via wireless communication.

21. The system of claim 20, wherein the software is able to control and/or monitor a plurality of systems as described in claim 1.

22. A system that is able to repel insects from an outdoor activity area, the system comprising:
   a central fuel reservoir configured to contain a combustible liquid fuel;
   at least one torch, each of said torches having a substantially enclosed interior and a local fuel reservoir located within said interior, the local fuel reservoir being configured to contain a local quantity of said fuel, each of said torches further comprising a combustion area exterior to the torch and configured for burning said fuel when drawn from said local quantity into said combustion area;
   a fuel plumbing system comprising hoses that are configured to convey said fuel from the central fuel reservoir to the local reservoirs of each of said torches; and
   a refueling system configured to cause the fuel to flow from the central reservoir through the fuel plumbing system to the local fuel reservoirs of each of the torches, the local fuel reservoirs being refilled thereby;
   wherein the torches, while interconnected with each other and with the central reservoir by the fuel plumbing system, are otherwise structurally independent and separate from each other and from the central reservoir;
   at least one of said torches further including:
      a wick extending from the local fuel reservoir of the torch to the combustion area, the wick being configured to draw the fuel from the local fuel reservoir of the torch to the combustion area of the torch by wicking; and
      a wick seal that surrounds the wick and inhibits air from entering the interior of the torch, wherein the wick seal can be sealed and unsealed under remote control.

* * * * *